US008271148B2

(12) United States Patent
Lee et al.

(10) Patent No.: US 8,271,148 B2
(45) Date of Patent: Sep. 18, 2012

(54) DISTRIBUTION AUTOMATION SYSTEM FOR REACTIVE POWER COMPENSATION AND ITS VOLTAGE CONTROL METHOD

(75) Inventors: Sung-Woo Lee, Daejeon (KR); Bok-Nam Ha, Daejeon (KR); Chang-Hoon Shin, Daejeon (KR); Min-Ho Park, Daejeon (KR); So-Young Park, Daejeon (KR)

(73) Assignee: Korea Electric Power Corporation, Gangnam-gu (KR)

( * ) Notice: Subject to any disclaimer, the term of this patent is extended or adjusted under 35 U.S.C. 154(b) by 286 days.

(21) Appl. No.: 12/656,290

(22) Filed: Jan. 25, 2010

(65) Prior Publication Data

US 2011/0035077 A1 Feb. 10, 2011

(30) Foreign Application Priority Data

Aug. 10, 2009 (KR) .......................... 10-2009-0073434

(51) Int. Cl.
*G06F 19/00* (2006.01)

(52) U.S. Cl. ........................ 700/298; 700/286; 700/297

(58) Field of Classification Search .................... 700/22, 700/286, 297, 298; 323/205
See application file for complete search history.

(56) References Cited

U.S. PATENT DOCUMENTS

| 5,422,561 | A | * | 6/1995 | Williams et al. | ............... | 700/298 |
| 5,594,659 | A | * | 1/1997 | Schlueter | ...................... | 700/286 |
| 5,610,834 | A | * | 3/1997 | Schlueter | ...................... | 323/205 |
| 6,100,676 | A | * | 8/2000 | Burstein et al. | ................ | 323/283 |
| 6,621,719 | B2 | * | 9/2003 | Steimer et al. | ................... | 363/43 |
| 6,894,463 | B2 | * | 5/2005 | Kernahan | ........................ | 323/267 |
| 7,194,338 | B2 | * | 3/2007 | Schlueter et al. | .............. | 323/205 |
| 7,459,893 | B2 | * | 12/2008 | Jacobs | ........................... | 323/282 |
| 7,769,497 | B2 | * | 8/2010 | Patel | .............................. | 700/298 |
| 8,024,076 | B2 | * | 9/2011 | Schlueter et al. | ............. | 700/286 |
| 8,041,465 | B2 | * | 10/2011 | Larsen et al. | .................. | 700/298 |

FOREIGN PATENT DOCUMENTS

JP 2009-159735 A 7/2009

OTHER PUBLICATIONS

Korean Office Action issued in Korean Patent Application No. 10-2009-0073434, dated May 30, 2011.

* cited by examiner

*Primary Examiner* — Charles Kasenge
(74) *Attorney, Agent, or Firm* — McDermott Will & Emery LLP

(57) ABSTRACT

Provided are a novel distribution automation system and its voltage control method, which can supply a stable voltage to a user by properly adjusting the settings of a control device so as to compensate for reactive power at each load terminal. The voltage control method includes: a first step of modeling a distribution system in the form of a distribution load based on constants of four terminals according to the connection type of each node and a distribution line, which constitute the distribution system; a second step of determining a formula for estimating the magnitude of a voltage at a node from a current value of an adjacent node; a third step of determining an objective function including the magnitude of the voltage, calculated through the formula determined in the second step, and a control variable for controlling the magnitude of the voltage; and a fourth step of calculating a value of the control variable to allow the determined objective function to have a minimum value and applying the calculated value to each voltage control device provided in the distribution system.

2 Claims, 4 Drawing Sheets

(a)

(b)

(c)

(a)

L : Load    F : FRTU (b)

DISTRIBUTION AUTOMATION SYSTEM FOR REACTIVE POWER COMPENSATION AND ITS VOLTAGE CONTROL METHOD

CROSS-REFERENCE TO RELATED APPLICATION

This application claims priority to and the benefit of Korean Patent Application No. 2009-0073434, filed on Aug. 10, 2009, the disclosure of which is incorporated herein by reference in its entirety.

BACKGROUND

1. Field of the Invention

The present invention relates to a distribution automation system for reactive power compensation and its voltage control method, and more particularly, to a distribution automation system and its voltage control method, which can minimize power loss by compensating for the reactive power at each node included in a complex radial distribution system.

2. Discussion of Related Art

A distribution system should be configured to reduce power loss by continuously supplying a voltage of an appropriate magnitude to a user without distortion.

Moreover, a bus voltage supplied to a distribution line varies as the power demand always varies, and thus the magnitude of the bus voltage frequently exceeds an optimal level of a load terminal to which the power demand is connected.

Accordingly, a voltage profile at each load terminal connected to the distribution line should be maintained within an appropriate limit range, and the control settings at such a voltage control device should be properly adjusted to minimize the power and energy loss.

Conventionally, methods for optimizing the voltage and reactive power in power systems have been proposed based on mathematical optimization algorithms such as linear, nonlinear, quadratic programming, and Newton and interior methods.

Further, a method based on a fuzzy theory or an expert system method has been employed to control the voltage in the distribution system. In addition, a method for diagnosing a probabilistic load flow based on voltage and reactive power control algorithm has been applied to the method together. And a standardized weighting method which considers the major factors required for the voltage control such as reactive power, feeder loss, voltage drop, voltage profile, etc. has also been proposed.

Meanwhile, with the rapid development of information technology (IT) and communication technology, a distribution automation system, in which these technologies are applied to the distribution system so as to detect a failure by obtaining voltage and current status data at each load terminal of the distribution line even at a remote location, has been developed. Accordingly, a voltage control algorithm for reactive power compensation based on the distribution automation system is required.

SUMMARY OF THE INVENTION

The present invention has been made in an effort to solve the above-described problems associated with prior art, and an object of the present invention is to provide a novel distribution automation system and its voltage control method, which can minimize power loss by estimating and calculating the magnitude of a voltage at each load terminal more accurately than the prior art and compensating for the reactive power with respect to the estimated and calculated voltage and thus supply a stable voltage to a user.

According to an aspect of the present invention, there is provided a method for controlling a voltage of a distribution automation system, the method including: a first step of modeling a distribution system in the form of a distribution load based on constants of four terminals according to the connection type of each node and a distribution line, which constitute the distribution system; a second step of determining a formula for estimating the magnitude of a voltage at a node from a current value of an adjacent node; a third step of determining an objective function including the magnitude of the voltage, calculated through the formula determined in the second step, and a control variable for controlling the magnitude of the voltage; and a fourth step of calculating a value of the control variable to allow the determined objective function to have a minimum value and applying the calculated value to each voltage control device provided in the distribution system.

According to another aspect of the present invention, there is provided a distribution automation system including: a voltage control device which supplies a voltage of a predetermined magnitude to each node connected in a distribution system according to a control value; a feeder remote terminal unit (FRTU) which is connected to the nodes and measures the magnitudes and phase angles of voltage and current at a node; and a distribution automation server which estimates and calculates the magnitude of a voltage at the node based on the measurement data at each node received from the FRTU, and controls the voltage control device to compensate for reactive power with respect to the estimated and calculated voltage.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail below with reference to the accompanying drawings such that those skilled in the art to which the present invention pertains can easily practice the present invention.

Figure 1:
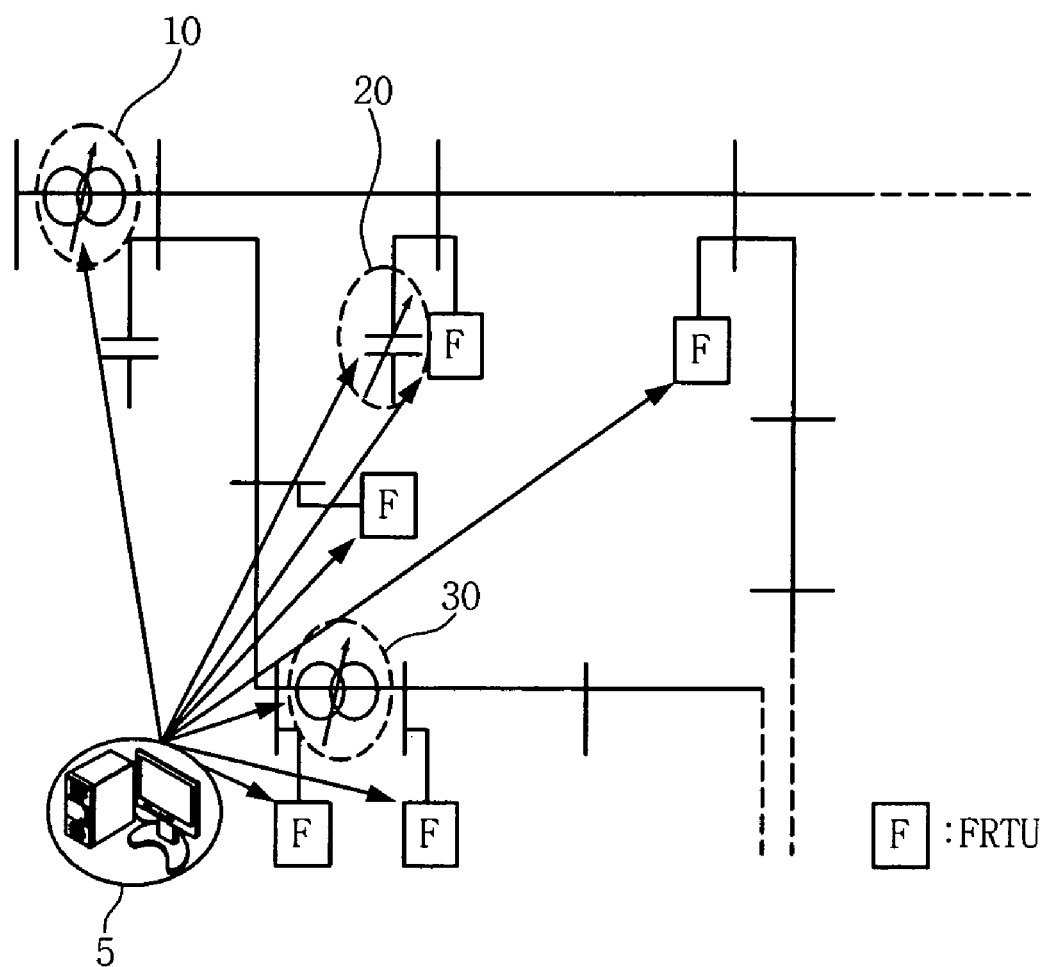
FIG. 1 is a block diagram illustrating a configuration of a typical distribution automation system.

FIG. 1 is a block diagram illustrating a configuration of a typical distribution automation system.

A distribution automation system 1 is a system in which a plurality of distribution line switches, which are remotely distributed over a wide area, are connected to each other through a communication network to transmit system operation information such as voltage or current to a distribution automation server 5, and the distribution automation server 5 monitors and controls the state of the distribution system based on the received data. Here, each of the distribution line switches includes a feeder remote terminal unit (F) (hereinafter referred to as "FRTU"), which measures and transmits various data required for the distribution automation server 5 to control the operation of the FRTU (F) or voltage control device, and examples of such data include the magnitudes and phase angles of voltage and current at a node to which the FRTU (F) is connected.

Moreover, various devices for controlling the voltage and reactive power may be included in the distribution system. For example, an automatic voltage regulator (AVR) may be provided to control a second bus voltage of a main transformer in a substation on the distribution line according to the operation of an under-load tap changer (ULTC) transformer 10, and a shunt condenser 20 may be installed along the feeder of the distribution system to control the reactive power of the distribution line. In this case, a step voltage regulator (SVR) 30 as a kind of the AVR may be installed in the distribution system and have an allowable voltage level range with a difference of about 5% from the maximum rated voltage level.

In the distribution automation system 1 in accordance with an embodiment of the present invention, a method for controlling the voltage control device may be performed based on the data received from each FRTU (F) connected to the distribution system.

In general, the FRTU (F) measures the phase angle of voltage, the magnitude of current, or the phase angle of current, which are almost the same as the actual values, and delivers the measured value to the distribution automation server 5. However, since many errors occur due to several factors such as load fluctuation and the like when measuring the magnitude of the voltage, the actual magnitude of the voltage at the node and the magnitude of the voltage measured at the FRTU (F) have an error of about 20%. Specifically, by way of example, the voltage at any node of the distribution system can be measured by connecting a grounding potential transmitter (GPT) to the node. In this case, the magnitude of the measure voltage has a large value; however, since the GPT should be directly connected to the distribution line, there is a limitation in size of the GPT. Accordingly, the transformation ratio at the GPT increases, and thus the measurement error increases due to an effect of transformation coil and the like.

Therefore, the distribution automation system in accordance with an embodiment of the present invention provides an algorithm which can accurately estimate the magnitude of the voltage at each node. Moreover, the distribution automation system adjusts the control settings of the voltage control device connected to the system so as to reduce the voltage drop by compensating for the reactive power at each node based on the estimated and calculated magnitude of the voltage at each node.

In this case, the data transmitted and received to and form each node may be synchronized with the GPS time, and a detailed description thereof will be omitted herein.

In the distribution automation system 1 in accordance with an embodiment of the present invention, the proposed algorithm employs a new load modeling.

That is, the new load modeling is applied under the assumption that the loads are uniformly distributed along the distribution line in the distribution system. Actually, the loads are irregularly distributed over the entire distribution line. Unlike the conventional method which assumes that the loads irregularly distributed in a section are collected as one measuring point, the present invention employs a method for applying constants of four terminals (four terminal constants), in which the loads are modeled under the assumption that the loads irregularly distributed in the respective sections are collected as one load and are uniformly distributed over the section line.

The load information is very important when calculating the load flow which supplies the active and reactive power required by the loads through several kinds of power supplies and line networks, especially in a complex radial distribution system in which different loads are distributed on the distribution lines of different distribution systems. Power consumed by the load is changed by the voltage level, and thus the load has a significant effect on the magnitude of the voltage. Accordingly, as described above, the proposed algorithm applies a distributed load modeling, which is different from the conventional one, to estimate and calculate the magnitude of the voltage, which will be described later with reference to FIG. 3.

In the complex radial distribution system, it is very difficult to obtain a solution for calculating the load flow at each node. The four terminal constants are intended to simplify the procedure of the load flow calculation, and since the current data measured by the FRTU is substantially the same as the actual value, it is possible to calculate the voltage and phase by applying the distribution system modeled with the measured currents and distributed loads to the four terminal constants.

A coefficient matrix in formula 1 represents the standard form of the four terminal constants.

$$\begin{bmatrix} V_q \\ I_q \end{bmatrix} = \begin{bmatrix} A_k & B_k \\ C_k & D_k \end{bmatrix} \begin{bmatrix} V_P \\ I_P \end{bmatrix} \qquad \text{[Formula 1]}$$

$$\begin{bmatrix} A_k & B_k \\ C_k & D_k \end{bmatrix} = \begin{bmatrix} \cosh\beta_k & -Z_k\sinh\beta_k \\ -\frac{1}{Z_k}\sinh\beta_k & \cosh\beta_k \end{bmatrix}$$

Here, since the different nodes constituting the radial distribution system have different environmental conditions such as the connection type and the like, the coefficient matrix regarding the four terminal constants may be expanded on a case-by-case basis as follows.

Figure 2:
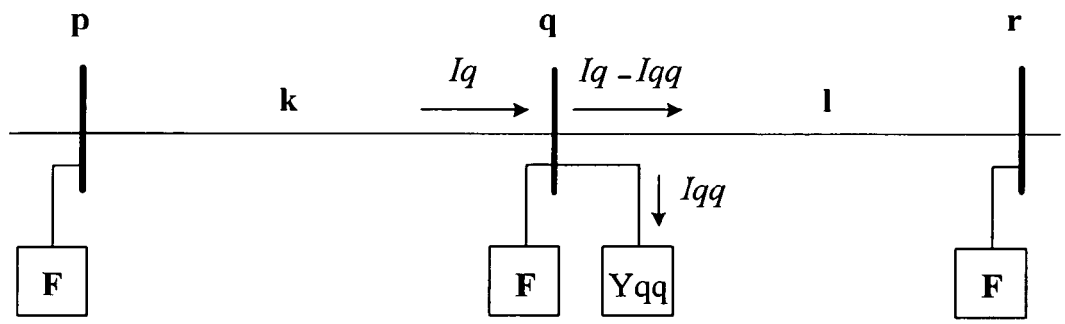
FIG. 2 is a diagram illustrating various connection types at each node in a distribution automation system in accordance with an embodiment of the present invention.
Figure 2:
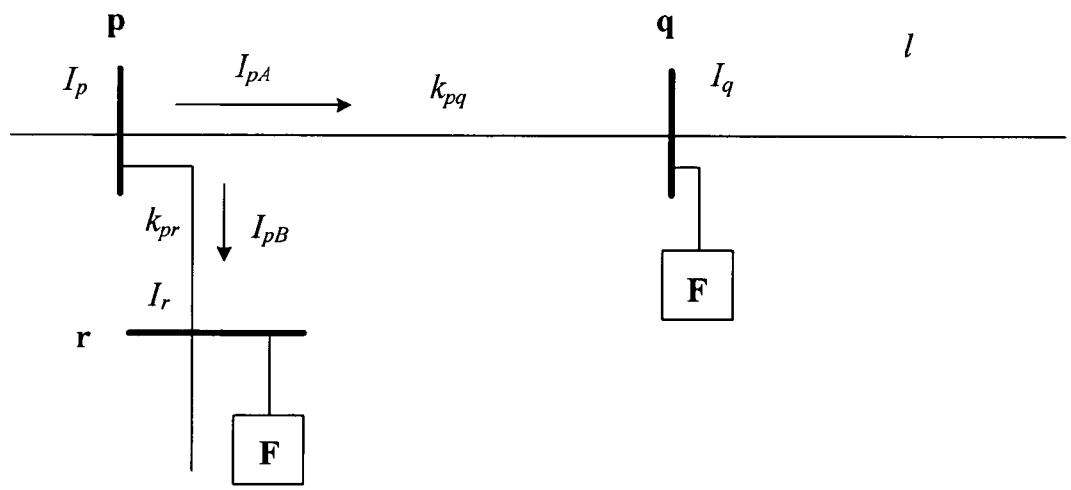
Figure 2:
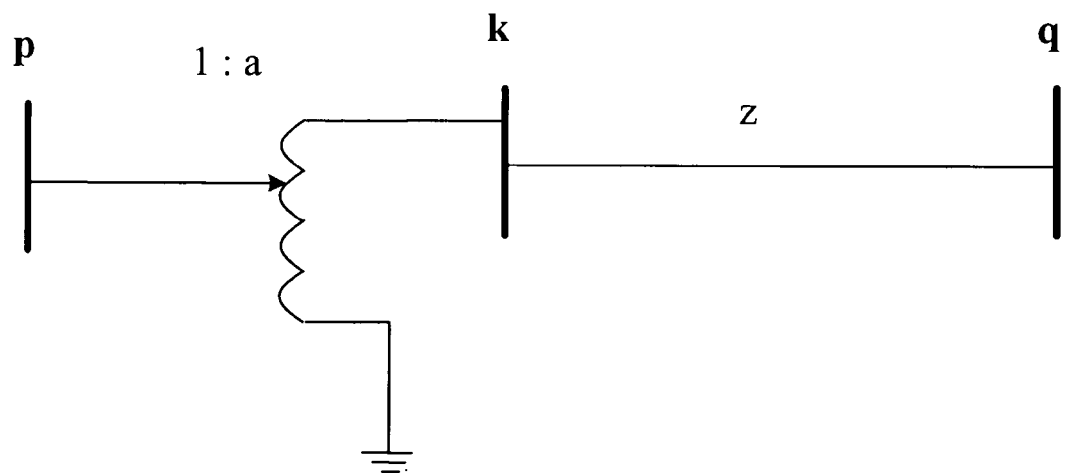

FIG. 2 is a diagram illustrating various connection types at each node in the distribution automation system in accordance with an embodiment of the present invention, wherein (a) of FIG. 2 illustrates a current flowing out of a node, (b) of FIG. 2 illustrates a current flowing through a node including a service line, and (c) of FIG. 2 illustrates a current flowing through a node to which a transformer is connected.

In (a) of FIG. 2, Iq represents the current flowing into node q, and Iqq represents the current flowing out of the distribution system. Accordingly, the current delivered from node q to node r is Iq-Iqq, and the coefficient matrix of four terminal constants is obtained from the formula for the voltage and current at node q, which is shown in the following formula 2.

$$\begin{bmatrix} A_1 & B_1 \\ C_1 & D_1 \end{bmatrix} = \begin{bmatrix} \cosh\beta_1 + Y_{qq}Z_1\sinh\beta_1 & -Z_k\sinh\beta_1 \\ -\frac{1}{Z_1}\sinh\beta_1 - Y_{qq}\cosh\beta_1 & \cosh\beta_1 \end{bmatrix} \qquad \text{[Formula 2]}$$

As shown in (b) of FIG. 2, a node including a branch line in a different direction may be included in the distribution system. In this case, Ip represents the load current flowing into node p, and IpA represents the load current between node p and node q. IpB represents the load current between node p and node r which corresponds to a branch section of node p, kpq represents the current distribution constant between node p and node q, and kpr represents the current distribution constant between node p and node r. In the case of (b) of FIG. 2, the coefficient matrix of four terminal constants for the voltage and current at node q can be expressed as the following formula 3.

$$\begin{bmatrix} A_k & B_k \\ C_k & D_k \end{bmatrix} = \begin{bmatrix} \cosh\beta_k & -k_{pq}Z_k \sinh\beta_k \\ -\frac{1}{Z_k}\sinh\beta_k & k_{pq}\cosh\beta_k \end{bmatrix} \quad \text{[Formula 3]}$$

In the case that a node is connected to the SVR transformer, the equivalent-circuit modeling can be defined as shown in (c) of FIG. 2. In this case, z represents the impedance of the transformer and the transformation ratio of the transformer is 1:a. Accordingly, in the case of (c) of FIG. 2, the coefficient matrix can be derived by the following formula 4.

$$\begin{bmatrix} A_k & B_k \\ C_k & D_k \end{bmatrix} = \begin{bmatrix} a & -\frac{z}{a} \\ 0 & \frac{1}{a} \end{bmatrix} \quad \text{[Formula 4]}$$

That is, the four terminal constants can be applied to the above-described three cases even in the complex radial distribution system, thereby deriving the formulas.

Meanwhile, in the distribution automation system and its voltage control method in accordance with an embodiment of the present invention, as a method for estimating the voltage profile in the distribution system, it is possible to obtain and use the values measured at a feeder head or another node and feeder parameter values.

Figure 3:
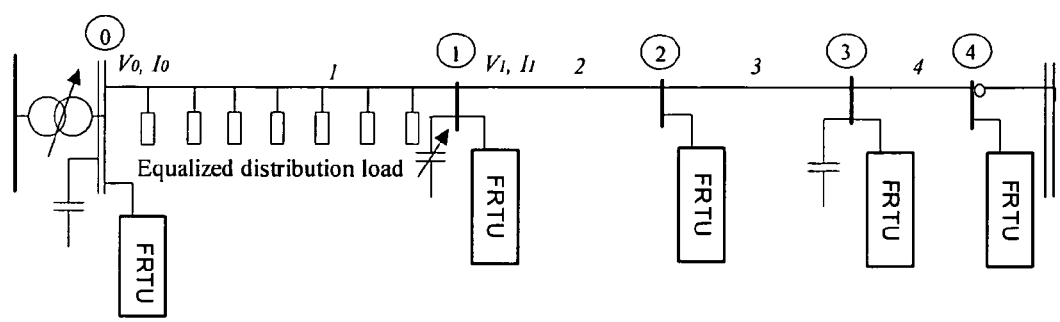
FIG. 3 is a diagram illustrating a load distribution between adjacent nodes in a distribution automation system in accordance with an embodiment of the present invention.
Figure 3:
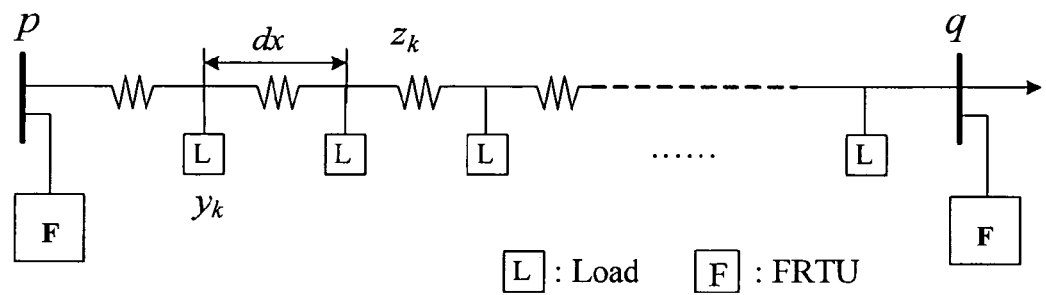

FIG. 3 is a diagram illustrating a load distribution between adjacent nodes in the distribution automation system in accordance with an embodiment of the present invention.

As shown in FIG. 3(a), the distribution automation system may include five nodes each having the FRTU. The method for obtaining the voltage profile at each node calculates the magnitudes and phase angles of voltage and current at node 1 by applying the magnitudes and phase angles of voltage and current at node 0 to an algorithm, which will be described later. Then, the magnitudes and phase angles of voltage and current at node 2 can be calculated based on the values obtained at the node 1, and it is possible to obtain the magnitudes and phase angles of voltage and current at each node by repeating the above-described process.

A step of calculating the magnitudes and phase angles of voltage and current at the node 1 based on the data measured at the node 0 is as follows.

When calculating the magnitudes and phase angles of voltage and current at node q between nodes p and q, it is assumed that line impedance $z_k$ and load admittance $y_k$ between the nodes p and q are uniformly distributed at each dx in the distribution line as shown in FIG. 3(b). In this case, the basic formulas of the voltage drop and the current drop at each load terminal can be expressed as the following formula 5.

$$dV(x) = -I(x)z\,dx$$

$$dI(x) = -V(x)y\,dx \quad \text{[Formula 5]}$$

wherein zdx represents the line impedance per unit length and ydx represents the load admittance per unit length.

When the differential equations shown in formula 5 are calculated, a solution can be obtained by the following formula 6.

$$V(x) = C_1 \cosh\gamma_k x + C_2 \sinh\gamma_k x$$

$$I(x) = C_3 \sinh\gamma_k x + C_4 \cosh\gamma_k x \quad \text{[Formula 6]}$$

wherein $\gamma_k = \sqrt{z_k y_k}$ represents the characteristic constant of the distribution line.

When considering a boundary condition at the node p (a current flowing into the node is the sum of the current flowing out of the node and the loss) in formula 6, formula 6 can be expressed as the following formula 7.

$$V(x) = V_p \cosh\gamma_k x - \frac{\gamma_k}{y_k} I_p \sinh\gamma_k x \quad \text{[Formula 7]}$$

$$I(x) = -\frac{y_k}{\gamma_k} V_p \sinh\gamma_k x + I_p \cosh\gamma_k x$$

Assuming that $L_k$ is the length of one section and phase x of the voltage and current at the load is equal to $L_k$ in formula 7, the following formula 8 can be derived from formula 7. In addition, other variables except the load admittance $y_k$ can be calculated when the voltage and current data at the node p is substituted for the above-described equation.

$$V_q = V_p \cosh\beta_k - Z_k I_p \sinh\beta_k \quad \text{[Formula 8]}$$

$$I_q = -\frac{V_p}{Z_k}\sinh\beta_k + I_p \cosh\beta_k$$

$$\text{wherein } Z_k = \sqrt{\frac{z_k}{y_k}} \text{ and } \beta_k = \gamma_k L_k$$

In formula 8, since Vq can be easily calculated when $y_k$ is obtained and substituted and there is no error factor caused by the conventional voltage measurement does, it can be estimated that Vq has almost the same magnitude of voltage as the actual one at the node q.

Accordingly, a process of obtaining information related to $y_k$ at the node of the load side and calculating the value of $y_k$ is required. In this case, $y_k$ can be calculated under the assumption that the magnitude of current is measured from the FRTU and that a phase difference between voltage and current is measured from the FRTU, which is same as the power factor angle.

Moreover, the distribution line can be classified into a line connected to the feeder terminal and a line not connected to the feeder terminal, and it is thus preferable to derive the required value for each of both cases.

In the case of the distribution line connected to the feeder terminal, a current value at the feeder terminal becomes zero. Accordingly, after $I_q=0$ is substituted for formula 8, the load admittance can be obtained by Newton-Raphson method. The Newton-Raphson method is a representative method among the algorithms for obtaining a root of an equation, however, the present invention is not limited to this method, and any method capable of calculating the load admittance from the above-described formula may be applied.

In the case of the distribution line not connected to the feeder terminal, two equations in the following formula 9 can be derived. The following formula 10 can be derived when formula 8 is applied to formula 9.

$$i_q^2 = I_q \cdot I_q^*$$

$$(V_q I_q^*)^2 = v_q^2 i_q^2 \cos^2 \varphi_q \qquad \text{[Formula 9]}$$

$$i_q^2 = \left(I_p \cosh\beta_k - \frac{V_p}{Z_k}\sinh\beta_k\right) \qquad \text{[Formula 10]}$$

$$\left(I_p \cosh\beta_k - \frac{V_p}{Z_k}\sinh\beta_k\right) *$$

$$((V_p \cosh\beta_k - Z_k I_p \sinh\beta_k)^2$$

$$\left(I_p \cosh\beta_k - \frac{V_p}{Z_k}\sinh\beta_k\right)^2$$

$$= i_q^2 (\cos\varphi_q)^2 (V_p \cosh\beta_k - Z_k I_p \sinh\beta_k)$$

$$(V_p \cosh\beta_k - Z_k I_p \sinh\beta_k)^*$$

wherein $I_q$ represents the magnitude of current at the node q as the node of the load side and $\phi_q$ represents the power factor angle at the node q.

The load admittance $y_k$ can be calculated when the Newton-Raphson method is applied to formula 10 in the same manner as the first case, and each $y_k$ calculated in both cases is substituted for formula 8 to calculate $V_q$ and $I_q$, the magnitudes and phase angles of voltage and current at the node of the load side.

The magnitude of voltage at each node calculated through above-described steps can be utilized to control the voltage control device connected to the distribution system in the distribution automation server. The proposed voltage control algorithm is based on a gradient method, and thus the voltage of each user may fall within an allowable range.

In the distribution automation system, the FRTU can collect data from a distribution network, and all voltage control devices spaced far apart from each other can be controlled by a command for allowing the magnitudes of voltage to fall within into an allowable range. Accordingly, as shown in FIG. 3, the tap positions in the ULTC, SVR, and shunt condenser can be varied. When the objective function for X is determined by considering the above three devices among the various voltage control devices, which can be connected to the distribution system, the following formula 11 can be obtained. In this case, X may represent all of control variable A and state variables V and I.

$$J(X) = \Sigma w_i (v_{ni} - |V_i|)^2$$

$$X = [A, V, I]^T$$

$$A = [a_1, a_2, \ldots, a_p]^T$$

$$V = [V_1, V_2, \ldots, V_n]^T$$

$$I = [I_1, I_2, \ldots, I_n]^T \qquad \text{[Formula 11]}$$

wherein A represents the control variable, V represents the node voltage, I represents the node current, $v_{ni}$ represents the rated voltage at each node, $V_i$ represents the voltage calculated at each node, $w_i$ represents the weight coefficient in each section, and n represents the number of all nodes.

The weight coefficient is included in the formula of the objective function because the voltage control is more important in a section having more loads. Further, the voltage control at a node having a larger difference between the constant N, the rated voltage, and the estimated and calculated voltage may be more important than other nodes, and thus an objective function for the corresponding node may be further required.

The state variables V and I satisfy the circuit equation. For example, the circuit equation for the section k between the nodes p and q in the distribution system is the same as the following formula 12, and when all circuit formulas for all sections of the distribution system are added to each other and expressed as F(X), they can be expressed as the following formula 13:

$$f_k^V(X) = V_q - A_k V_p - B_k I_p = 0$$

$$f_k^I(X) = I_q - C_k V_p - D_k I_p = 0 \qquad \text{[Formula 12]}$$

$$F(X) = [F^V(X), F^I(X)]^T$$

$$F^V(X) = [f_1^V(X), f_1^V(X), \ldots, f_S^V(X)]^T$$

$$F^I(X) = [f_1^I(X), f_2^I(X), \ldots, f_S^I(X)]^T \qquad \text{[Formula 13]}$$

In this case, when the control variable is changed, the magnitude of node voltage, the magnitude of node current, and the like may also be changed.

In order to obtain a minimum value by the method for obtaining the solution from the above-described objective function, formula 11 should satisfy the following formula 14:

$$\frac{\partial J(X + \Delta X)}{\partial t} = 0 \qquad \text{[Formula 14]}$$

$$\text{Wherein } \Delta X = \sum_{k=1}^{p} \Delta X_k,$$

$$\Delta X_k = \frac{\partial X}{\partial a_k} \Delta a_k, \Delta a_k = -t \frac{\partial J}{\partial a_k}, t$$

represents the acceleration factor, and k=1, 2, . . . .

In this case, the gradient of the objective function J(X) can be expressed as $\nabla J_k$, which can be expressed as follows:

$$\nabla J_k = \frac{\partial J}{\partial a_k} = \left(\frac{\partial J}{\partial X}\right)^T \frac{\partial X}{\partial a_k}$$

Moreover, the gradient vector of the state variable with respect to the control variable can be expressed as $\nabla X_k$, and When F(X) for the control variable $a_k$ is partially differentiated in the formula for $\nabla J_k$, the following result can be obtained:

$$\frac{\partial F(X)}{\partial a_k} = \frac{\partial F(X)}{\partial X} \nabla X_k$$

$$\text{Wherein } \nabla X_k = \left(\frac{\partial F(X)}{\partial x}\right)^{-1} \frac{\partial F(X)}{\partial a_k}.$$

Accordingly, when the above formula is applied to formula 14 to obtain a solution, a control variable for each voltage control device can be obtained.

Figure 4:
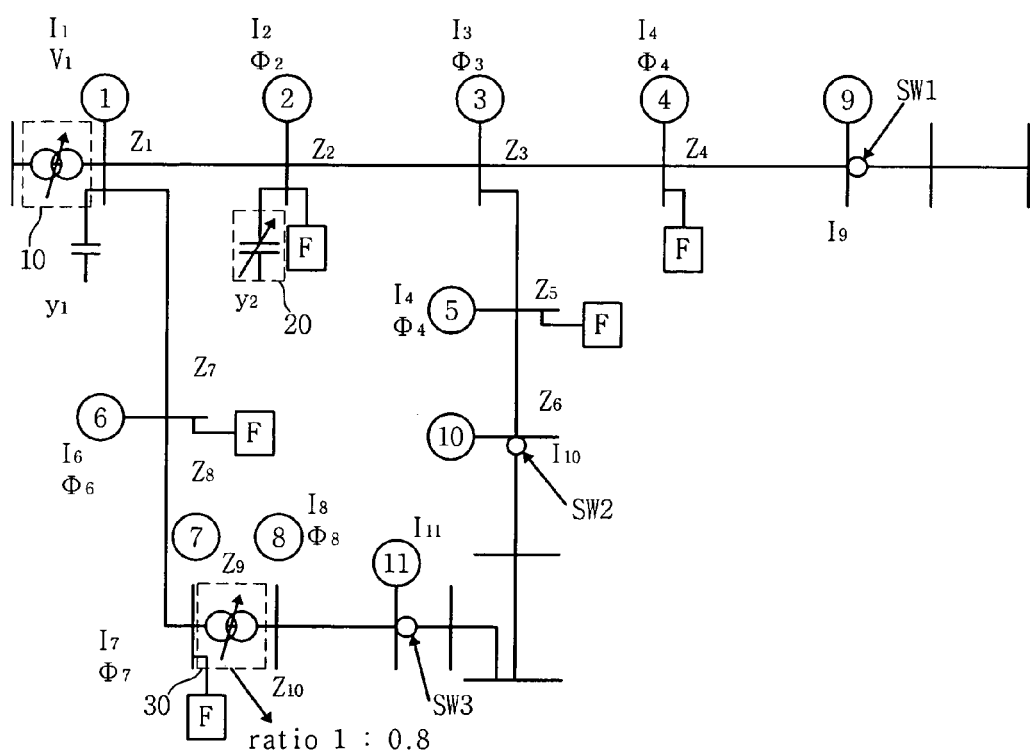
FIG. 4 is a diagram illustrating a configuration of a distribution automation system in accordance with an embodiment of the present invention.

FIG. 4 is a diagram illustrating a configuration of a distribution automation system in accordance with an embodiment of the present invention.

As shown in FIG. 4, the distribution automation system in accordance with an embodiment of the present invention includes 11 nodes, and the ULTC 10, shunt condenser 20, and SVR 30 are included therein as the voltage control devices. In this case, the ULTC 10 is connected to the node 1, and the SVR 30 is disposed between the node 7 and the node 8. The shunt condenser 20 is connected to the node 2 to compensate for reactive power on the distribution line.

Distribution line parameters in the distribution automation system in accordance with an embodiment of the present invention are shown in the following table 1. In the distribution automation system, the FRTU collects and measures information such as the magnitude of current and the power factor angle as shown in the following table 2 and transmits the information to the distribution automation server.

TABLE 1

| Section No. | Node No. | Resistance (p.u.) | Reactance (p.u.) | Current distribution coefficient |
|---|---|---|---|---|
| 1 | 1-2 | 0.0058 | 0.0029 | 0.5 |
| 2 | 2-3 | 0.0308 | 0.0157 | 1.0 |
| 3 | 3-4 | 0.0228 | 0.0116 | 0.5 |
| 4 | 4-9 | 0.0238 | 0.0121 | 1.0 |
| 5 | 3-5 | 0.0511 | 0.0441 | 0.5 |
| 6 | 5-10 | 0.0117 | 0.0386 | 1.0 |
| 7 | 1-6 | 0.1068 | 0.0771 | 0.5 |
| 8 | 6-7 | 0.0643 | 0.0462 | 1.0 |
| 9 | 7-8 | 0.0010 | 0.0400 | 1.0 |
| 10 | 8-11 | 0.0123 | 0.0041 | 1.0 |

TABLE 2

| Node No. | Magnitude of current (p.u) | Power factor angle (rad) |
|---|---|---|
| 1 | 1.000 | π/8 |
| 2 | 0.400 | π/8 |
| 3 | 0.225 | π/8 |
| 4 | 0.075 | π/8 |
| 5 | 0.050 | π/8 |
| 6 | 0.400 | π/8 |
| 7 | 0.200 | π/8 |
| 8 | 0.250 | π/8 |
| 9 | 0 | π/8 |
| 10 | 0 | π/8 |
| 11 | 0 | π/8 |

In this case, the transformation ratio of the transformer 10 is 1:0.8, and the compensation coefficient of the shunt condenser 20 is 0.03.

Meanwhile, the objective function according to the distribution automation system as shown in FIG. 4 can be expressed as the following formula 15, in which the weight coefficient is set to 1.

$$J(X) = \Sigma(v_m - |V_i|)^2 \quad \text{[Formula 15]}$$

wherein $X=[A,V,I]^T$, $A=[a_1,a_2,a_3]^T$, $V=[V_1, V_2, \ldots, V_{11}]^T$, $I=[I_1, I_2, \ldots, I_{11}]^T$, $a_1$ represents the control variable of the ULTC at the node 1, $a_2$ represents the control variable of the shunt condenser at the node 2, and $a_3$ represents the control variable of the SVR at the node 7.

The initial values of the respective variables are $a_1=1.0$, $a_2=1.0$, and $a_3=0.8$, and the magnitudes and phase angles of voltage and current at each node estimated and calculated by the method in accordance with an embodiment of the present invention are shown in the following table 3.

TABLE 3

| | Control variable $a_1 = 1.0, a_2 = 1.0, a_3 = 0.8$ | | | |
|---|---|---|---|---|
| Node | Voltage (p.u.) | | Current (p.u.) | |
| No. | Magnitude | Phase angle | Magnitude | Phase angle |
| 1 | 1.0000 | 0 | 1.0000 | −0.3927 |
| 2 | 0.9971 | −0.0003 | 0.4000 | −0.3052 |

TABLE 3-continued

| | Control variable $a_1 = 1.0, a_2 = 1.0, a_3 = 0.8$ | | | |
|---|---|---|---|---|
| Node | Voltage (p.u.) | | Current (p.u.) | |
| No. | Magnitude | Phase angle | Magnitude | Phase angle |
| 3 | 0.9749 | 0.0212 | 0.2250 | −0.2837 |
| 4 | 0.9726 | 0.0208 | 0.0750 | −0.2841 |
| 5 | 0.9698 | 0.0191 | 0.0500 | −0.3736 |
| 6 | 0.9425 | −0.0141 | 0.4000 | −0.4068 |
| 7 | 0.9194 | −0.0200 | 0.2000 | −0.4127 |
| 8 | 0.7315 | −0.0325 | 0.2500 | −0.4127 |
| 9 | 0.9716 | 0.0207 | 0.0000 | −0.1244 |
| 10 | 0.9692 | 0.0183 | 0.0000 | 0.5148 |
| 11 | 0.7299 | −0.0323 | 0.0000 | −0.4461 |

When the proposed voltage control method is applied to each node, the control variables for the ULTC, the SVC and the shunt condenser can be adjusted to $a_1=1.0394$, $a_2=0.9742$, and $a_3=1.0764$, and thus the magnitudes and phase angles of voltage and current estimated and calculated at each node are shown in the following table 4.

TABLE 4

| | Control variable $a_1 = 1.0394, a_2 = 0.9742, a_3 = 1.0764$ | | | |
|---|---|---|---|---|
| Node | Voltage (p.u.) | | Current (p.u.) | |
| No. | Magnitude | Phase angle | Magnitude | Phase angle |
| 1 | 1.0394 | 0 | 1.2014 | −0.4289 |
| 2 | 1.0363 | −0.0001 | 0.4277 | −0.3939 |
| 3 | 1.0133 | 0.0215 | 0.2321 | −0.2818 |
| 4 | 1.0108 | 0.0211 | 0.0779 | −0.2838 |
| 5 | 1.0080 | 0.0194 | 0.0520 | −0.3733 |
| 6 | 0.9605 | −0.0182 | 0.5645 | −0.4145 |
| 7 | 0.9252 | −0.0269 | 0.3602 | −0.4193 |
| 8 | 0.9905 | −0.0393 | 0.3347 | −0.4193 |
| 9 | 1.0098 | 0.0209 | 0.0000 | −0.1244 |
| 10 | 1.0073 | 0.0186 | 0.0000 | 0.5148 |
| 11 | 0.9868 | −0.0391 | 0.0000 | −0.4461 |

Referring to the magnitude of voltage at each node in table 3, the voltage drops at the nodes 8 and 11 are greater than those at other nodes. Accordingly, when the adjusted control settings are delivered to the voltage control devices connected to the nodes 8 and 11 in the distribution automation server, the reactive power at the nodes 8 and 11 is compensated as shown in table 4, and thus the degree of voltage drop is significantly reduced over the case of table 3.

Specifically, in the conventional method, where the voltage drop occurring at the node of the feeder end side such as node 8 or node 11 is compensated by increasing the magnitude of voltage at the feeder head (i.e., the feeding terminal of the substation), the voltage at the upstream node side is increased to exceed the rated voltage range when the load is not connected due to an accident or the like. On the contrary, in the embodiment of the present invention, the voltage drop is suppressed by adjusting the operation of at least one voltage control device disposed on the distribution line, and thus it is possible to supply a more stable voltage.

While the distribution automation system for reactive power compensation and its voltage control method in accordance with the present invention have been described with reference to the accompanying drawings, it will be apparent to those skilled in the art that various modifications can be made to the above-described exemplary embodiments of the present invention without departing from the spirit or scope of the invention, which accurately estimates and calculates the magnitude of voltage at each node and changes the control settings of the voltage control device provided in the distribution system so as to minimize power loss and supply a stable voltage to the users. Thus, it is intended that the present invention covers all such modifications provided they come within the scope of the appended claims and their equivalents.

What is claimed is:

1. A method for controlling a voltage of a distribution automation system, the distribution automation system including a plurality of nodes and a distribution line, the method comprising the steps of:

modeling a distribution system in the form of a distribution load based on constants of four terminals according to a type of connection between each of the plurality of nodes and the distribution line;

determining a first formula for estimating the magnitude of a voltage at a node, among the plurality of nodes, from a current value;

determining a second formula for a current at the node according to whether the distribution line is connected to a feeder terminal, and calculating a load admittance from the determined second formula;

estimating and calculating the magnitude of the voltage at the node by substituting the calculated load admittance in the determined first formula;

determining an objective function including the calculated magnitude of the voltage and including a control variable for controlling the magnitude of the voltage; and calculating a value of the control variable to allow the determined objective function to have a minimum value, and applying the calculated value of the control variable to each of voltage control devices provided in the distribution automation system.

2. The method of claim 1, wherein the load admittance is calculated by applying a Newton-Raphson method.

* * * * *